United States Patent
Lee (10) Patent No.: US 12,179,456 B2
(45) Date of Patent: Dec. 31, 2024

(54) PAPER STRAW

(71) Applicant: LEE & B INC., Gyeonggi-do (KR)

(72) Inventor: Heon Kug Lee, Gyeonggi-do (KR)

(73) Assignee: LEE & B INC., Gyeonggi-do (KR)

( * ) Notice: Subject to any disclaimer, the term of this patent is extended or adjusted under 35 U.S.C. 154(b) by 493 days.

(21) Appl. No.: 17/616,259

(22) PCT Filed: Jun. 4, 2020

(86) PCT No.: PCT/KR2020/007310
§ 371 (c)(1),
(2) Date: Dec. 3, 2021

(87) PCT Pub. No.: WO2020/246840
PCT Pub. Date: Dec. 10, 2020

(65) Prior Publication Data
US 2022/0322857 A1    Oct. 13, 2022

(30) Foreign Application Priority Data

Jun. 7, 2019  (KR) .................. 10-2019-0067384
Jul. 2, 2019  (KR) .................. 10-2019-0079442
(Continued)

(51) Int. Cl.
*B31D 5/00* (2017.01)
*A47G 21/18* (2006.01)
(Continued)

(52) U.S. Cl.
CPC .......... *B31D 5/0095* (2013.01); *A47G 21/18* (2013.01); *B31C 3/00* (2013.01); *C09J 5/06* (2013.01); *C09J 133/08* (2013.01); *D21H 27/32* (2013.01)

(58) Field of Classification Search
CPC .... A47G 21/18; A47G 21/181; A47G 21/182; A47G 21/183; A47G 21/184;
(Continued)

(56) References Cited

U.S. PATENT DOCUMENTS

2018/0094165 A1  4/2018  Yoon
2019/0069701 A1  3/2019  O'Neill
(Continued)

FOREIGN PATENT DOCUMENTS

CA    768465 A    10/1967
CN   109431212 A    3/2019
(Continued)

OTHER PUBLICATIONS

JP 2006-225044 Machine Translation (Year: 2006).*
The extended European search report for European counterpart Application No. 20817665.1, dated Jul. 13, 2023.

*Primary Examiner* — Zachary M Davis
(74) *Attorney, Agent, or Firm* — United One Law Group LLC; Kongsik Kim; Jhongwoo Peck (57) ABSTRACT

In order to solve the disadvantages of plastic straws in terms of environmental pollution, and the inconvenience of the above-described paste-adhered paper straws, provided is a paper straw comprising: an inner paper portion in which a single strip of paper without a heat-adhesive coating material on the inside surface thereof is spirally wound so as to form a single layer, and an outer paper portion which comprises at least one paper strip forming at least one layer around the outer peripheral surface of the inner paper portion while being wound in a spiral, and which is provided with the heat-adhesive coating material on the outside surface of the paper strip forming the outermost layer, wherein the paper strip of the outer paper portion has a wider width than the paper strip of the inner paper portion, the heat-adhesive coating material is provided between two (Continued)

paper strips of adjacent different layers, and the heat-adhesive coating material has adhesive strength or water resistance according to heating and curing.

17 Claims, 9 Drawing Sheets

(30) Foreign Application Priority Data

| | | |
|---|---|---|
| May 7, 2020 | (KR) | 10-2020-0054805 |
| May 7, 2020 | (KR) | 10-2020-0054806 |
| May 7, 2020 | (KR) | 10-2020-0054809 |

(51) Int. Cl.
  *B31C 3/00* (2006.01)
  *C09J 5/06* (2006.01)
  *C09J 133/08* (2006.01)
  *D21H 27/32* (2006.01)

(58) Field of Classification Search
  CPC .. A47G 21/185; A47G 21/186; A47G 21/187; A47G 21/188; A47G 21/189; B31D 5/0095; B31D 3/00; B31D 3/02; B31D 3/04; D21H 19/10; D21H 19/12; D21H 19/14; D21H 19/26; D21H 19/20; D21H 27/32
  See application file for complete search history.

(56) References Cited

U.S. PATENT DOCUMENTS

| | | | |
|---|---|---|---|
| 2020/0000259 A1* | 1/2020 | Hsu | A47G 21/18 |
| 2021/0395951 A1* | 12/2021 | Yamamoto | B32B 1/08 |

FOREIGN PATENT DOCUMENTS

| | | | | |
|---|---|---|---|---|
| CN | 208603016 U | | 3/2019 | |
| CN | 208896606 U | | 5/2019 | |
| EP | 0515952 A2 | | 12/1992 | |
| EP | 1591232 A1 | | 11/2005 | |
| ES | 2208106 A1 | | 6/2004 | |
| JP | S43-004837 A | | 2/1968 | |
| JP | S50-091808 A | | 7/1975 | |
| JP | S53-148709 A | | 12/1978 | |
| JP | S59-114045 A | | 6/1984 | |
| JP | S59-198133 A | | 11/1984 | |
| JP | S61-163840 A | | 7/1986 | |
| JP | S63-249637 A | | 10/1988 | |
| JP | S63-270126 A | | 11/1988 | |
| JP | H04-031035 A | | 2/1992 | |
| JP | H05-124047 A | | 5/1993 | |
| JP | 06-133840 A | | 5/1994 | |
| JP | 07-195584 A | | 8/1995 | |
| JP | H08-188303 A | | 7/1996 | |
| JP | H11-513472 A | | 11/1999 | |
| JP | 2002-028995 A | | 1/2002 | |
| JP | 2002-160312 A | | 6/2002 | |
| JP | 2004-222588 A | | 8/2004 | |
| JP | 2006225044 A | * | 8/2006 | A23L 2/52 |
| JP | 2006-315703 A | | 11/2006 | |
| JP | 2007-152719 A | | 6/2007 | |
| JP | 2014-124817 A | | 7/2014 | |
| JP | 5706580 B1 | | 3/2015 | |
| JP | 3218847 U | | 11/2018 | |
| KR | 10-0515685 B1 | | 9/2005 | |
| KR | 10-1266934 B1 | | 5/2013 | |
| KR | 10-2018-0089880 A | | 8/2018 | |
| KR | 10-1973367 B1 | | 4/2019 | |
| KR | 10-1977354 B1 | | 5/2019 | |
| KR | 10-2020-0029159 A | | 3/2020 | |

* cited by examiner

FIG. 9

PAPER STRAW

CROSS-REFERENCE TO RELATED APPLICATIONS

This application is a U.S. national entry of International Application No. PCT/KR2020/007310 filed on Jun. 4, 2020, which claims priority to and the benefit of Korean Patent Application No. 10-2019-0067384 filed on Jun. 7, 2019, Korean Patent Application No. 10-2019-0079442 filed on Jul. 2, 2019, Korean Patent Application No. 10-2020-0054805 filed on May 7, 2020, Korean Patent Application No. 10-2020-0054806 filed on May 7, 2020, and Korean Patent Application No. 10-2020-0054809 filed on May 7, 2020. The applications are incorporated herein by reference.

TECHNICAL FIELD

The present disclosure relates to a paper straw having paper components.

BACKGROUND ART

Typical straws were often formed of a plastic material. Plastic straws have the advantages of easy processing, low manufacturing cost, light weight, and no problem of other ingredients being infiltrated into beverages when used. However, due to the nature of the material, it takes a long time to decompose after being discarded, and it is also harmful to the human body, so there are growing calls to replace them.

To address these needs, a method of reusing the manufactured straw or a method of replacing the material of the straw itself with an eco-friendly material is continuously being developed. For example, straws made of reusable plastic or metal are proposed. However, straws are often used for businesses, and in this case, reuse of straws has limitations in terms of hygiene or the infrastructure of each business.

For this reason, recently, disposable straws made of paper material have been proposed. Disposable straws made of paper material are of sufficient value to replace conventional plastic straws in that they are not only harmless to the human body but also minimize environmental pollution.

Paper straws are manufactured in such a way that paper strips are wound multiple times in an oblique direction. Typical paper straws are then fixed in shape by applying glue on the wound paper strips and hardening the glue.

However, these glue-adhesive paper straws bring time and space inefficiency in that they have to go through a drying process in the middle of the manufacturing process. In addition, there are cases in which foreign substances adhere to and harden together during the drying process. Furthermore, when the produced paper straws are put into beverages and used, the solidified glue may melt again and deteriorate the components of the beverages. In addition, there is a risk that beverages may easily seep into the paper of the straw due to the easy melting of the glue, which destroys the shape of the straw and makes it impossible to perform the function.

DISCLOSURE OF INVENTION

Technical Goals

An aspect is to address the issues of environmental pollution of the above-mentioned plastic straws and inconvenience of the above-mentioned glue-adhesive paper straws.

Technical Solutions

According to an aspect, there is provided a paper straw including an inner paper part including a single paper strip that does not have a thermal adhesive coating material on an inner surface and is spirally wound to form one layer, and an outer paper part including at least one paper strip forming at least one layer by wrapping an outer peripheral surface of the inner paper part while spirally wound, an outer surface of the paper strip forming an outermost layer being provided with a thermal adhesive coating material. The paper strip of the outer paper part may have a wider width than the paper strip of the inner paper part. A thermal adhesive coating material may be provided between two paper strips of adjacent different layers. The thermal adhesive coating materials may have adhesion or water resistance by heating and curing.

In addition, according to another aspect, there is provided the paper straw in which the thermal adhesive coating material provided on the outer surface of the paper strip forming the outermost layer and the thermal adhesive coating material provided between the two paper strips of the adjacent different layers are composed of a same ingredient.

In addition, according to another aspect, there is provided the paper straw in which the thermal adhesive coating materials include an acrylate-based heat-sealable material.

In addition, according to another aspect, there is provided the paper straw in which the thermal adhesive coating material provided on the outer surface of the paper strip forming the outermost layer has water resistance by heating and curing, and the thermal adhesive coating material provided between the two adjacent paper strips has adhesion and water resistance by heating and curing.

In addition, according to another aspect, there is provided the paper straw in which a width of each of the paper strips is 10 mm to 30 mm.

In addition, according to another aspect, there is provided the paper straw in which the paper strip corresponding to the inner paper part does not overlap while spirally wound, and each paper strip corresponding to the outer paper part overlaps while spirally wound.

In addition, according to another aspect, there is provided the paper straw in which a thermal adhesive coating material is provided in the overlapping region of the outer paper part.

In addition, according to another aspect, there is provided the paper straw in which each of the paper strips is provided by a mass per unit area of 40 gsm to 120 gsm.

In addition, according to another aspect, there is provided the paper straw in which a ratio of mass per unit area of the paper strip forming the outermost layer of the outer paper part with respect to the paper strip of the inner paper part is 0.5 to 0.8.

In addition, according to another aspect, there is provided the paper straw in which a mass per unit area of the thermal adhesive coating material provided on one surface of any one of the paper strips is 1 gsm to 15 gsm.

In addition, according to another aspect, there is provided the paper straw in which the thermal adhesive coating material is provided with an amount of 1 gsm to 3 gsm on the outer surface of the paper strip forming the outermost layer, and the thermal adhesive coating material is provided with an amount of 10 gsm to 20 gsm between the two paper strips of the adjacent different layers.

In addition, according to another aspect, there is provided the paper straw in which the paper strips are kraft papers, and the thermal adhesive coating material is provided with an amount of 14 gsm to 20 gsm between the two paper strips of the adjacent different layers.

In addition, according to another aspect, there is provided the paper straw in which a ratio of mass per unit area of the thermal adhesive coating material provided on the outer surface of the paper strip forming the outermost layer with respect to the thermal adhesive coating material provided between the two paper strips of the adjacent different layers is 0.1 to 0.6.

In addition, according to another aspect, there is provided the paper straw in which the inner paper part forms an inner paper layer, and two paper strips of the outer paper part are spirally wound to form a middle paper layer and an outer paper layer, respectively.

In addition, according to another aspect, there is provided the paper straw in which both surfaces of the middle paper layer and both surfaces of the outer paper layer are provided with thermal adhesive coating materials.

In addition, according to another aspect, there is provided the paper straw in which a width of the paper strip of the outer paper layer is larger than a width of the paper strip of the middle paper layer.

In addition, according to another aspect, there is provided the paper straw in which a width of the paper strip of the inner paper layer is 13.5 mm, the width of the paper strip of the middle paper layer is 14 mm, and the width of the paper strip of the outer paper layer is 15 mm.

Effects

According to example embodiments, the paper straw of the present disclosure has the following effects.

According to at least one of the example embodiments of the present disclosure, a paper straw can be manufactured directly without a drying process, thereby saving manufacturing time and space for drying and solving the issue of producing paper straws with foreign substances attached thereto.

In addition, according to at least one of the example embodiments of the present disclosure, it is possible to produce hygienic paper straws because the disinfection or sterilization effect is accomplished by heating, in particular, high-temperature hot air.

In addition, according to at least one of the example embodiments of the present disclosure, since the glue does not melt when drinking, the taste of the drink is not altered and the shape of the straw can be maintained for a long time.

Further scope of applicability of the present disclosure will become apparent from the following detailed description. However, various changes and modifications within the spirit and scope of the present disclosure can clearly be understood by those skilled in the art, so it should be understood that the detailed description and specific example embodiments such as preferred embodiments of the present disclosure are given by way of example only.

BEST MODE FOR CARRYING OUT THE INVENTION

Hereinafter, example embodiments disclosed in the present specification will be described in detail with reference to the accompanying drawings, in which the same or similar components are assigned the same reference numerals regardless of number of the drawings and overlapping descriptions thereof are omitted. The suffixes "module" and "part" for the components used in the following description are given or mixed in consideration of only the ease of writing the specification, and do not have distinct meanings or roles by themselves. In addition, in describing the example embodiments disclosed in the present specification, if it is determined that detailed descriptions of related known technologies may obscure the gist of the example embodiments disclosed in the present specification, the detailed description thereof will be omitted. In addition, the accompanying drawings are only for easy understanding of the example embodiments disclosed in the present specification, and the technical spirit disclosed herein is not limited by the accompanying drawings, and it should be understood to include all changes, equivalents, or substitutes included in the spirit and scope of the present disclosure.

Figure 1:
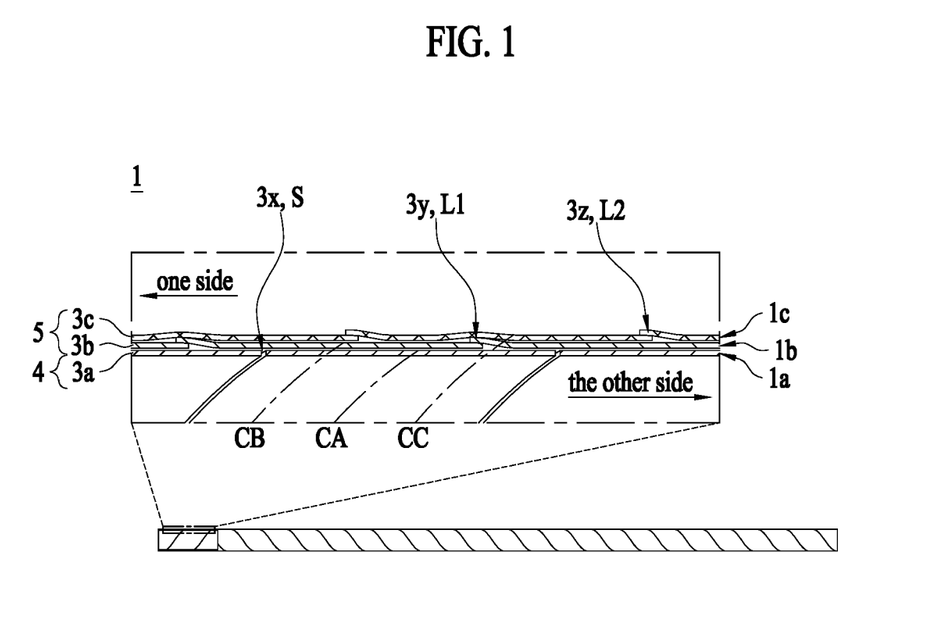
FIG. 1 illustrates a front view and a partial enlarged longitudinal sectional view of a paper straw manufactured by a paper straw manufacturing system related to the present disclosure.
Figure 2:
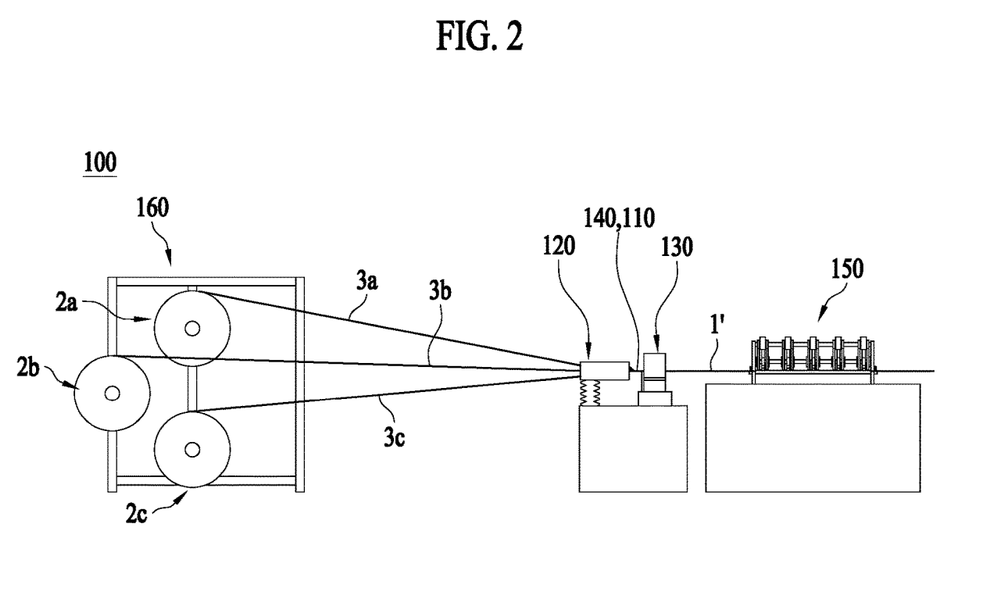
FIG. 2 is a schematic diagram of a paper straw manufacturing system related to the present disclosure.
Figure 3:
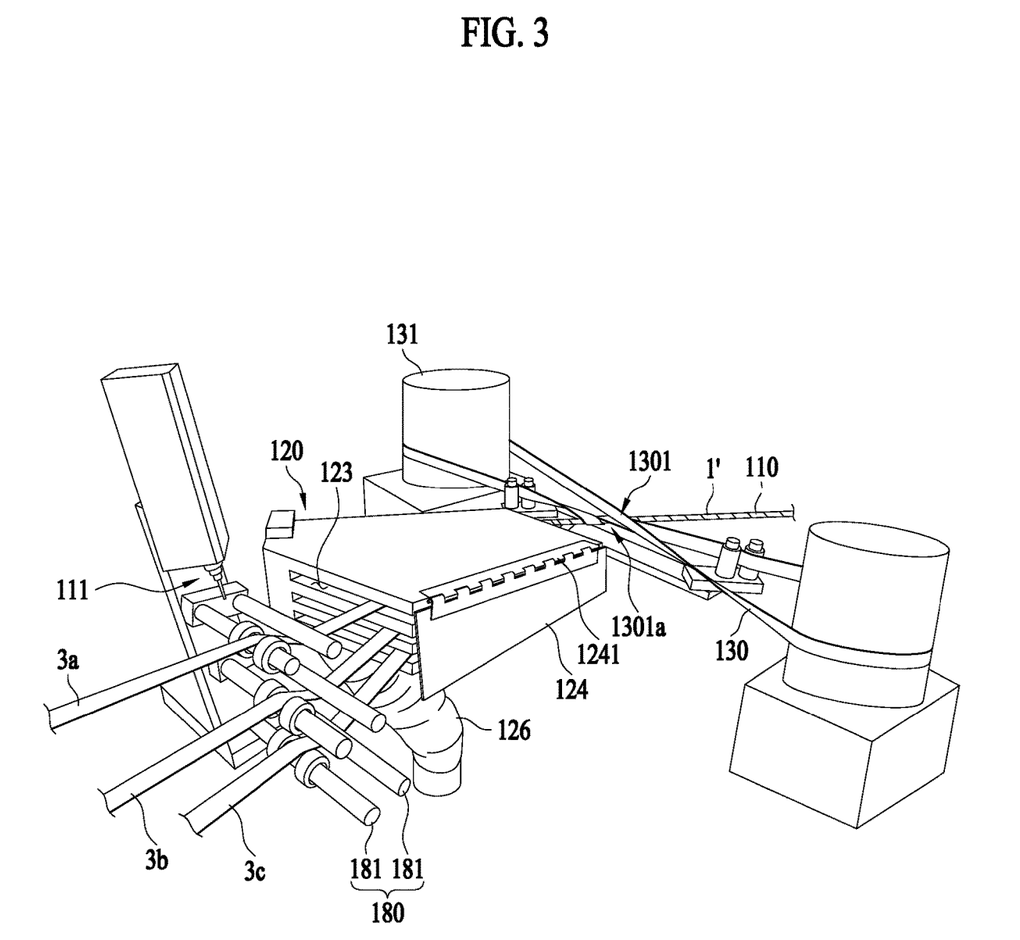
FIG. 3 illustrates a region provided with a heater in a paper straw manufacturing system related to the present disclosure.

FIG. 1 illustrates a front view and an enlarged view of some longitudinal cross-sections of a paper straw 1 manufactured by a paper straw manufacturing system 100 related to the present disclosure, FIG. 2 is a schematic diagram of the paper straw manufacturing system 100 related to the present disclosure, and FIG. 3 illustrates a region provided with a heater 120 in the paper straw manufacturing system 100 related to the present disclosure.

The paper straw manufacturing system 100 of the present disclosure refers to a set of at least one component, member or apparatus for manufacturing the paper straw 1. The paper straw manufacturing system 100 of the present disclosure is not required to be configured as a single apparatus, and thus components included in the paper straw manufacturing system 100 may include a plurality of physically separated apparatuses.

Briefly, the paper straw manufacturing system 100 of the present disclosure may include a roll 2, a core rod 110, a heater 120, a belt 130, a movement guide part 140, and a cutting part 150. A paper strip 3 wound on the roll 2 becomes the raw material of the paper straw 1, and the remaining components operate so that the paper strip 3 can be formed into the paper straw 1.

The paper straw 1 is manufactured by a method in which the paper strip 3 is wound and fixed. The paper straw 1 may be formed of several layers of paper, and one layer is formed by winding a single continuous paper strip 3 spirally a plurality of times. More specifically, the paper strip 3 is wound around the core rod 110 and fixed, and then falls out of the core rod 110 to have the shape of the paper straw 1, that is, a cylindrical shape having a hollow in the longitudinal direction.

When the paper straw 1 is formed of several layers of paper, the rigidity of the paper straw 1 increases to help maintain the shape of the paper straw 1. In addition, the paper strip 3 of another adjacent layer also serves to fill a gap that may occur when the paper strip 3 is repeatedly wound spirally.

To achieve this purpose, the paper straw 1 needs to have at least two layers. That is, the paper straw 1 is composed of an inner paper part 4 constituting an inner layer and an outer paper part 5 constituting an outer layer. More specifically, the inner paper part 4 may be defined as a layer formed by a single paper strip 3 for forming the inner circumferential surface of the paper straw 1, and the outer paper part 5 may be defined as at least one layer formed by the other paper strips 3.

For example, when the paper straw 1 is formed of three layers, a layer formed by one inner paper strip 3a becomes the inner paper part 4, and two layers formed by two outer paper strips 3b and 3c become the outer paper part 5 (see FIG. 1).

As another example, when the paper straw 1 is formed of two layers, a layer formed by the inner paper strip 3 becomes the inner paper part 4, and a layer formed by the outer paper strip 3 becomes the outer paper part 5.

That is, the inner paper part 4 means the innermost layer formed by the single paper strip 3, and the outer paper part 5 means at least one layer located outside the inner paper part 4 and formed by at least one paper strip 3. At least one paper strip 3 of the outer paper part 5 wraps around the outer circumferential surface of the inner paper part 4.

The outer paper part 5 serves to fill the gap that may occur only with the inner paper part 4, and also supplements the durability problem that may be insufficient with the inner paper part 4 alone.

As the paper straw 1 is formed in several layers, the rigidity increases and the probability of occurrence of gaps decreases, but the manufacturing cost increases, the weight increases, and the diameter of the space where the beverage is sucked up decreases. Thus, an appropriate compromise is required.

Considering the above, the paper straw 1 is preferably composed of three layers. That is, the outer paper part 5 is preferably composed of two paper strips 3b and 3c. The paper straw 1 composed of three layers has the advantage that the probability of occurrence of a gap is significantly lower than that of the paper straw 1 composed of two layers, and the rigidity can also be sufficiently guaranteed.

Hereinafter, it will be described on the assumption that the paper straw 1 is composed of three layers. However, other features of the paper straw manufacturing system 100 of the present disclosure are only premised on the case that the paper straw 1 is composed of a plurality of layers, and does not necessarily require that it should be composed of three layers.

In the three-layered paper straw 1, the paper strip 3 constituting the innermost layer and the paper strip 3 constituting the outermost layer are defined as an inner paper 1a and an outer paper 1c, respectively, and also, we define the paper strip 3 provided between the inner paper 1a and the outer paper 1c is defined a middle paper 1b.

In addition, in order to further enhance the durability of the paper straw 1, the paper strip boundaries 3x, 3y, and 3z of the respective layers may be manufactured to be shifted. The boundary (gap or overlap region; 3x, 3y, or 3z) generated by the spiral winding of each paper strip 3a, 3b or 3c becomes a relatively weak region. Therefore, it is preferable that these boundary regions 3x, 3y, and 3z are provided to be displaced from each other rather than overlapped on a straight line in the stacking direction.

Accordingly, the center line CB of the paper strip 3b of the middle paper 1b is provided biased to one side than the center line CA of the paper strip 3a of the inner paper 1a, and the center line CC of the paper strip 3c of the outer paper 1c is provided biased to the other side than the center line CA of the paper strip 3a of the inner paper 1a. At this time, the degree of bias is less than half the width of the paper strip 3. This is because, when the degree of bias is greater than the half the width of the paper strip 3, it goes closer to the paper strip of the adjacent round in the spiral pattern, so that the above feature becomes meaningless.

The paper strips 3 corresponding to respective layers of the paper straw 1 are formed by unwinding from respective separate rolls 2a, 2b, and 2c. The inner paper strip 3a is formed from the inner paper roll 2a, the outer paper strip 3c is formed from the outer paper roll 2c, and the middle paper strip 3b is formed from the middle paper roll 2b.

The paper strip 3 is unwound from the roll 2 to be wound around the core rod 110.

The outer circumferential surface of the core rod 110 becomes the opposite surface to which the paper strip 3 is wound in a straw shape. Therefore, the outer diameter of the core rod 110 corresponds to the inner diameter of the straw.

The core rod 110 is made of a metal material to ensure rigidity and heat resistance. The metal core rod 110 prevents deformation during winding and advance of the paper strip 3, and also minimizes the press and stick phenomenon of the paper strip 3.

The belt 130 presses the paper strip 3 to the core rod 110 so that the paper strip 3 can be wound in close contact with the core rod 110. The paper strip 3 pressed by the belt 130 is wound around the core rod 110 to form a preparatory straw 1'. The preparatory straw 1' is defined as the paper strip 3 after being wound around the core rod 110 and before being cut by the cutting part 150.

The preparatory straw 1' is advanced in one longitudinal direction of the core rod 110 by the movement guide part 140, and the advanced preparatory straw 1' is cut by the cutting part 150 to form the paper straw 1.

The biggest feature of the paper straw manufacturing system 100 of the present disclosure is that the paper strips 3 have already been provided with solidified thermal adhesive coating material 11 when they are in rolls 2 and they receive heat during the process of winding around the core rod 110 to be fixed in the shape of a straw. That is, while the conventional manufacturing system goes through a process of applying glue and drying after making a paper straw shape first, in the case of the present disclosure, the drying process is omitted. Therefore, it is possible to save time for drying, which was conventionally necessary, and the dryer provided for drying can also be omitted.

The heater 120 heats the paper strip 3 being wound around the core rod 110. The thermal adhesive coating material 11 of the heated paper strip 3 is melted and then hardened in an instant, and gets an adhesive force to fix the paper strip 3 wound in the shape of a straw.

Figure 4:
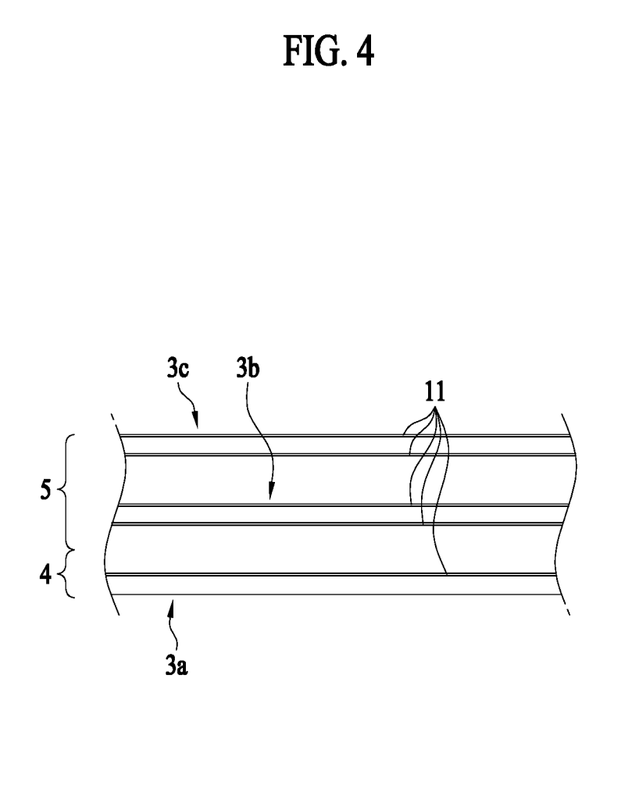
FIG. 4 is a side view of a paper strip of a paper straw related to the present disclosure.

FIG. 4 is a schematic side view of respective paper strips 3a, 3b, and 3c of the paper straw manufacturing system 100 related to the present disclosure.

The thermal adhesive coating material 11 may be formed of an acrylate-based heat-sealing material. In particular, the thermal adhesive coating material 11 is an eco-friendly material and may have the properties of a water-based coating agent. As a representative example, the thermal adhesive coating material 11 may be one of the RP-series of rePAPER Inc., and in particular, RP200 may be a suitable example.

The thermal adhesive coating material 11 may be provided on at least one surface of the paper strip 3. The paper strip 3 is cured after the thermal adhesive coating material 11 is applied to at least one surface, and is wound up and stored in rolls 2.

The thermal adhesive coating material 11 may be provided on at least one surface of each of the inner paper strip 3a, middle paper strip 3b, and outer paper strip 3c. When the thermal adhesive coating material 11 of the paper strip 3 is heated and cured, it adheres to the adjacent paper strip 3 facing the thermal adhesive coating material 11. On the other hand, the thermal adhesive coating material 11 that does not face the paper strip 3 serves only as a coating. That is, even with the same thermal adhesive coating material 11, when there is a counterpart, it serves both as the adhesive and as the coating, and when there is no counterpart, it serves only as the coating. That is, when the thermal adhesive coating material 11 provided on one surface of any paper strip 3 is heated and cured in contact with the adjacent paper strip 3, it is adhered with the adjacent paper strip 3 and coated, and when it is exposed to the outside without coming into contact with any paper strip 3 and heated and cured, it acts as the coating. At this time, the coating may mean a waterproof coating having water resistance so that the paper strip 3 is not easily got wet or seeped by an external liquid.

The thermal adhesive coating material 11 may be provided on the outer surface of the inner paper strip 3a, the inner surface and the outer surface of the middle paper strip 3b, and the inner surface and the outer surface of the outer paper strip 3c. The inner paper strip 3a and the middle paper strip 3b are bonded to each other by the thermal adhesive coating material 11 provided on the outer surface of the inner paper strip 3a and the inner surface of the middle paper strip 3b. The middle paper strip 3b and the outer paper strip 3c are bonded to each other by the thermal adhesive coating material 11 provided on the outer surface of the middle paper strip 3b and the inner surface of the outer paper strip 3c.

That is, the two adjacent paper strips 3 adhere as the two thermal adhesive coating materials 11 provided on opposite surfaces are heated and compressed. Heating and curing the thermal adhesive coating material 11 on both sides of the opposite paper strips 3 improves adhesion reliability, which also contributes to an increase in production speed. For example, it is more advantageous in terms of adhesion reliability and production speed if 5 gsm of the thermal adhesive coating material 11 is provided on each of the two sides of the two opposite paper strips 3 than the case of heating and curing where only one side of the two paper strips 3 is provided with 10 gsm and the other side is without any of them.

However, if necessary, only one surface of the two surfaces may be provided with the thermal adhesive coating material 11.

The thermal adhesive coating material 11 provided on the outer surface of the outer paper strip 3c has water resistance to act as the coating to prevent a liquid such as beverage from seeping into the paper straw 1. On the other hand, the thermal adhesive coating material 11 is not provided on the inner surface of the inner paper strip 3a, which is to prevent the inner paper strip 3a, which is directly facing the core rod 110, from being pressed and stuck thereon. In other words, the thermal adhesive coating material 11 is not provided on the inner surface of the paper strip (corresponding to the inner paper strip 3a above) of the inner paper part 4, but provided on the outer surface of the paper strip (corresponding to the outer paper strip 3c above) forming the outermost layer of the outer paper part 5 and between two adjacent paper strips (the inner paper strip 3a and the middle paper strip 3b, the middle paper strip 3b and the outer paper strip 3c). The thermal adhesive coating material 11 performs the coating function on the outer surface of the paper strip forming the outermost layer of the outer paper part 5, and the thermal adhesive coating material 11 between two adjacent paper strips performs the coating and adhesion function.

Each paper strip 3 may be provided with a mass per unit area of 40 gsm to 120 gsm, which is applied differently in consideration of the specifications of the paper straw 1 and the like.

It is advantageous that the outer paper strip 3c has a smaller mass per unit area than the middle paper strip 3b or the inner paper strip 3a. This is because the outer paper strip 3c is a portion that touches a user's mouth as a straw, so that the protruding area due to overlapping, etc., is minimized when the thickness is thin, and this gives the user less sense of foreign substances. Preferably, the ratio of mass per unit area of the paper strip 3 (i.e., outer paper strip 3c) forming the outermost layer of the outer paper part 5 with respect to the paper strip 3 (i.e., inner paper strip 3a) of the inner paper part 4 may be 0.5 to 0.8.

The amount of the thermal adhesive coating material 11 provided on one surface of the paper strip 3 may be 1 gsm to 15 gsm. The amount to which the thermal adhesive coating material 11 is applied is an important factor for proper adhesion reliability and waterproof performance. While a sufficient amount must be applied to achieve adhesion and coating performance, using as little as possible helps to reduce manufacturing costs.

In particular, in order to ensure adhesion reliability between adjacent paper strips 3 of different layers, the thermal adhesive coating material 11 may be provided on both sides of the paper strip 3 in an amount of 5 gsm to 10 gsm, respectively. Since the thermal adhesive coating material 11 for adhesion is provided on each opposite surface of the two paper strips 3 facing each other, when the two paper strips 3 are combined, 10 gsm to 20 gsm of the thermal adhesive coating material 11 will be provided.

The thermal adhesive coating material 11 provided on one surface of the paper strip 3 for adhesion may vary depending on the paper material. In the case of kraft paper in which the paper structure of the paper strip 3 is not relatively dense, it may be provided in 7 gsm to 10 gsm, and in the case of general paper in which the paper structure is relatively dense, it may be provided in 5 gsm to 7 gsm. In other words, when the two surfaces of the paper strips 3 adhere, the total amount of the thermal adhesive coating material 11 between the two paper strips 3 is 14 gsm to 20 gsm in the former case, and 10 gsm to 14 gsm in the latter case.

Meanwhile, since the outer surface of the outer paper strip 3c does not need the adhesion but only requires the coating function, a smaller amount than the above case may be provided. For example, the thermal adhesive coating material 11 provided on the outer surface of the outer paper strip 3c may be provided in a range of 1 gsm to 3 gsm.

The ratio of mass per unit area of the thermal adhesive coating material 11 provided on the outer surface of the paper strip 3 forming the outermost layer with respect to the thermal adhesive coating material 11 provided between the two adjacent paper strips 3 is 0.1 to 0.6.

Referring back to FIG. 3, in order to prevent the inner surface of the inner paper strip 3a from being pressed and stuck on the core rod 110, an oil supply 111 applies oil to the inner surface of the inner paper strip 3a facing the core rod 110 in direct contact. The oil supply 111 may apply oil to the inner paper strip 3a at a point before the paper strip 3 is wound on the core rod 110. It may be implemented in such a way that a certain amount of the oil is periodically dropped. The oil-coated inner paper strip 3a can minimize the frictional force generated between the preparatory straw 1' and the core rod 110 even if it is wound around the core rod 110 since a film is formed between the two components. The oil may include edible soybean oil in particular, considering the usage environment of the paper straw 1.

For oil drop, the inner paper strip 3a may be fed onto the core rod 110 so that the inner surface thereof comes to the top. That is, from the top, the inner paper strip 3a, the middle paper strip 3b, and the outer paper strip 3c are sequentially fed onto the core rod 110, and they may be provided so as to be wound into the lower side of the core rod 110.

In some cases, the middle paper strip 3b may be omitted to form the paper straw 1 only with the inner paper strip 3a and the outer paper strip 3c. Even in this case, the above-described characteristics of the inner paper strip 3a and the outer paper strip 3c are maintained as they are.

Figure 5:
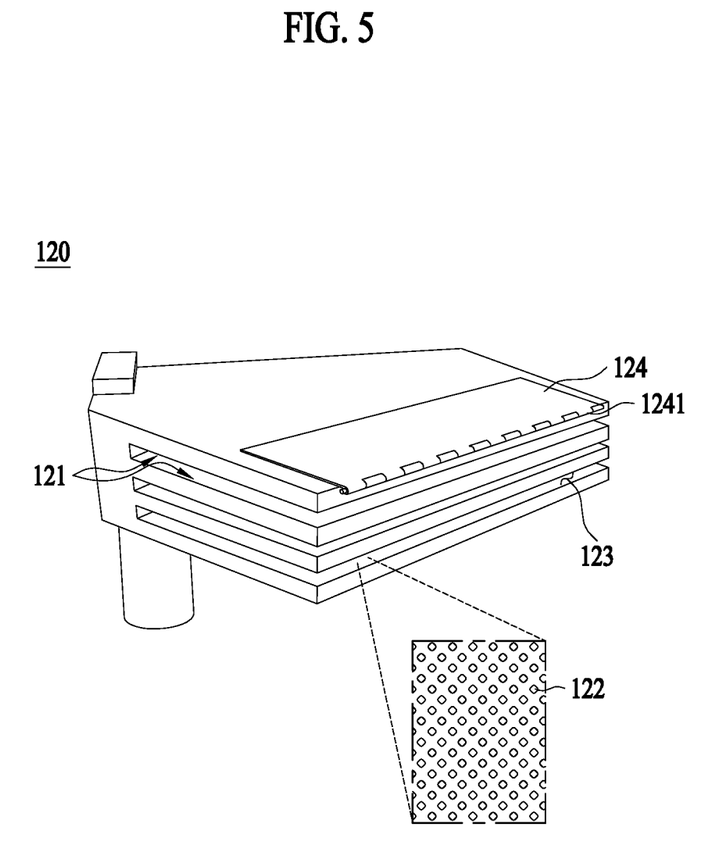
FIG. 5 illustrates a heater of a paper straw manufacturing system related to the present disclosure.

FIG. 5 illustrates a heater 120 of the paper straw manufacturing system 100 related to the present disclosure. FIGS. 1 to 4 are also referred together.

The heater 120 heats the paper strip 3 being wound around the core rod 110, more specifically, the thermal adhesive coating material 11 provided on the paper strip 3 to couple the two adjacent paper strips 3 to be fixed to each other.

The heater 120 heats the paper strip 3 at a point before the paper strip 3 starts to be wound on the core rod 110 and causes the paper strip 3 to be wound on the core rod 110 in a heated state. At this time, it is preferable that the heater 120 is provided immediately before the winding point, because if heated at a point much before the winding point, the paper strip 3 may be wound on the core rod 110 while the heated thermal adhesive coating material 11 is cooled.

There may be various ways to heat the paper strip 3, but in particular, the heater 120 may be driven by a hot air supply method. Heating the paper strip 3 with the hot air supply method makes it easy to heat the object to be heated when it is separated from the heat source. Also, it prevents the issue of burning or scorching the object from being in direct contact with the heat source, and the object to be heated can be heated over a relatively large area.

The heater 120 includes a hot air supply surface 121 corresponding to at least one surface of the paper strip 3. The hot air supply surfaces 121 corresponding to one paper strip 3 may be provided on both sides to correspond to respective surfaces of the paper strip 3. The hot air supply surface 121 is preferably provided to face at least the surface of the paper strip 3 on which the thermal adhesive coating material 11 is provided.

The hot air supply surface 121 may include a porous duct 122 through which the hot air is distributed and supplied. The porous duct 122 makes the paper strip 3 passing the hot air supply surface 121 to be heated uniformly and continuously for the widest possible area.

When it is the case where the inner paper strip 3a, the middle paper strip 3b, and the outer paper strip 3c are fed onto the core rod 110, the heater 120 may have three slits 123 to allow the three paper strips 3 to pass through. In particular, each slit 123 may be defined as a space between two facing hot air supply surfaces 121.

Each slit 123 is formed to have a width and thickness that are sufficiently larger than the width and thickness of the paper strip 3 to secure a free space so that the paper strip 3 fed to be wound on the core rod 110 may move in the width direction or thickness direction within the slit 123 to take an appropriate position.

At this time, the hot air supply surface 121 may have a shape corresponding to the paper strip 3 or the space occupied by the paper strip 3. This increases the thermal efficiency and improves the adhesion reliability of the paper strip 3. More specifically, the hot air supply surface 121 may have a trapezoidal shape whose width becomes narrower in the moving direction of the paper strip 3. This is due to the shape in which the inner paper strip 3a, the middle paper strip 3b, and the outer paper strip 3c are arranged to gather together as they approach the core rod 110 in order to overlap and be wound on the core rod 110.

As the length of the heater 120 increases, it is possible to simultaneously supply heat to a larger area of the paper strip 3. In addition, there is an advantage that the speed of the preparatory straw 1' advancing along the core rod 110 may increase. The appropriate length of the heater 120 relative to the direction in which the paper strip 3 passes is 30 cm to 45 cm. This is a value reflecting the above factors, and the speed of the preparatory straw 1' passing the core rod 110, which is 50 meter/min to 65 meter/min. When the moving speed of the preparatory straw 1' increases, the length of the heater 120 becomes longer, and when the moving speed decreases, the length of the heater 120 may become shorter.

At least one side of the heater 120 may have an opening/closing member 124 that can be opened and closed so that the paper strip 3 can be easily positioned in the slit 123 of the heater 120 during the initial setting process. The opening/closing member 124 is provided to rotate by the hinge 1241 so that the paper strip 3 can be initially inserted, and heat loss can be reduced by using the same member as the other regions of the heater 120.

The opening/closing member 124 allows the paper strip 3 to be easily positioned in the slit 123 and prevents heat from being lost laterally during the heating process.

Figure 6:
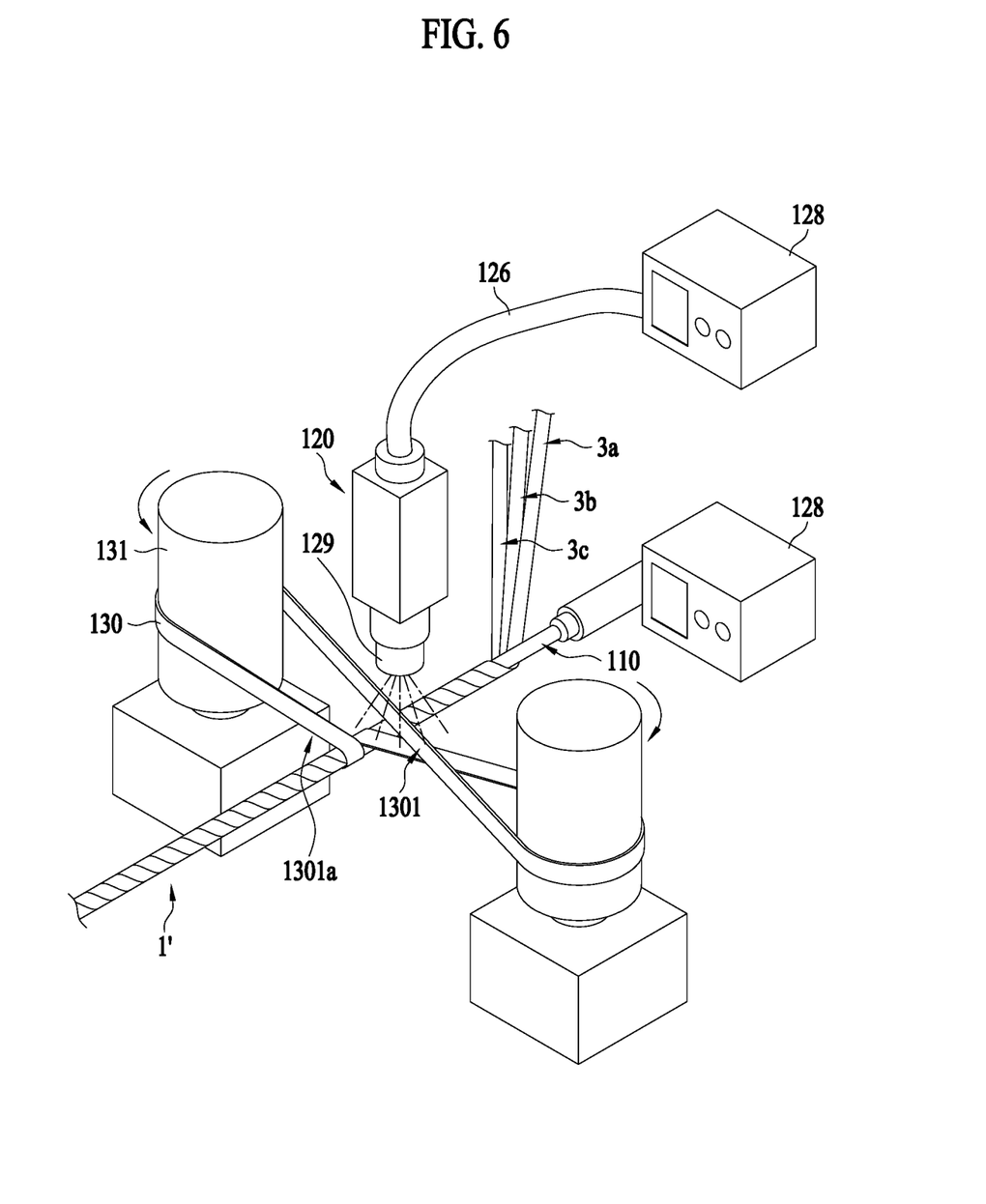
FIG. 6 relates to another example embodiment of a paper straw manufacturing system related to the present disclosure.

FIG. 6 relates to another example embodiment of the paper straw manufacturing system 100 related to the present disclosure.

Unlike the heater 120 described above, it may be provided in a manner that provides hot air only from one side of the paper strip 3 fed onto the core rod 110. The heater 120 of this example embodiment may be provided alone, or it may be provided together with the heater 120 of the previous example embodiment to further increase adhesion reliability.

The heaters 120 of the hot air method described in FIGS. 5 and 6 may include a high-pressure blower for forming a fluid, and the fluid formed through this may pass through the air hose 126 and come out to the hot air supply surface 121 or the outlet. Immediately before the hot air supply surface 121 or the outlet, an air heating member 129 is provided to increase the temperature of the fluid.

The heater 120 may include a temperature measurement part and a temperature controller 128 that adjusts the output based on the measured temperature so that the fluid may be supplied at a constant temperature or a desired temperature. An appropriate temperature for supplying heat to the heater 120 by the temperature controller 128 is 350° C. to 380° C. This is due to the melting point of the thermal adhesive coating material 11. Therefore, in the case of the paper straw 1 manufactured using the thermal adhesive coating material 11, it does not melt even when the paper straw 1 is put in hot water, for example, boiling water at 100° C. In addition, disinfection or sterilization effect can be obtained at the same time through high-temperature heating, so it is hygienic.

Figure 7:
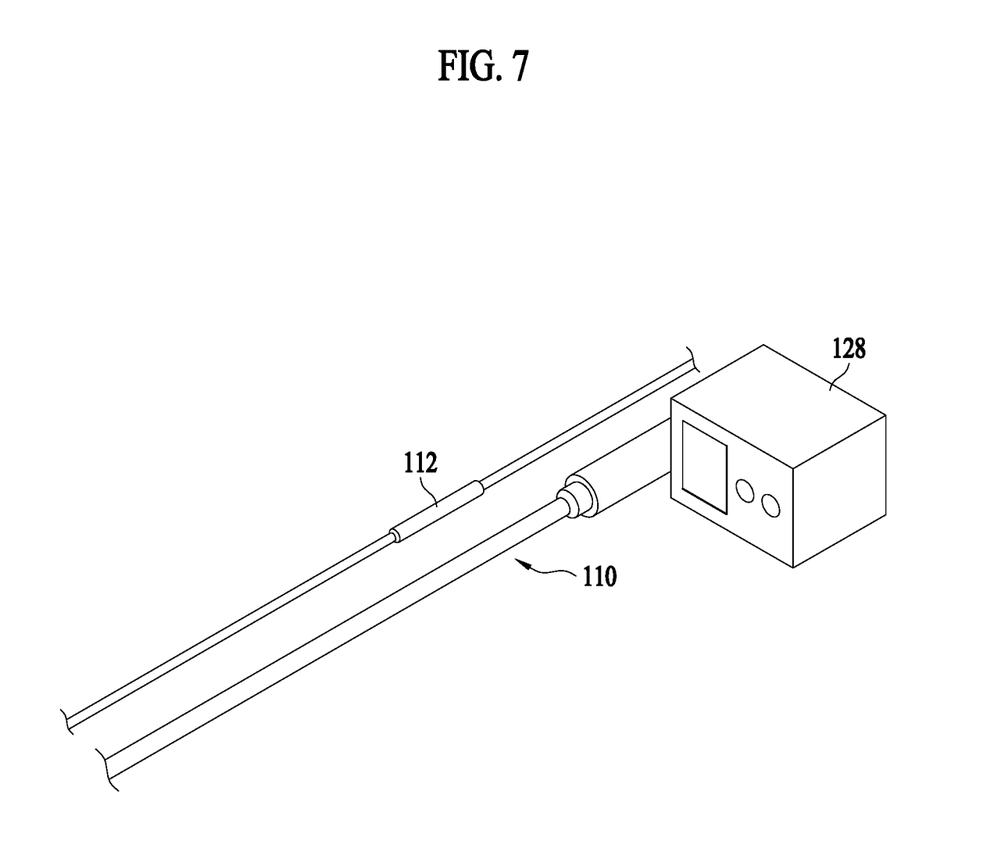
FIG. 7 relates to yet another example embodiment of a paper straw manufacturing system related to the present disclosure.

FIG. 7 relates to yet another example embodiment of the paper straw manufacturing system 100 related to the present disclosure.

In addition, the core rod 110 itself may serve as the heater 120 independently or additionally. One region of the core rod 110 may be provided with a material that generates heat to help the paper strip 3 to be heated and fixed in the course of advance. For example, the core rod 110 includes a nickel hot wire 112 for one region, and the nickel hot wire 112 is configured as a circuit and may be heated according to the application of current.

The heating method of the core rod 110 may be used along with the heating method of the heater 120 described above.

The heatable core rod 110 may also include a temperature measurement part and the temperature controller 128 to maintain a desired temperature.

Referring back to FIG. 3 or FIG. 6, the belt 130 presses the paper strip 3 to be wound around the core rod 110 in the shape of a paper straw 1. The belt 130 holds the paper strip 3 so that the paper strip 3 can be wound around the core rod 110 while being twisted. To this end, the belt 130 needs to twist the paper strip 3. To this end, the belt 130 forms a closed loop, and the closed loop belt 130 is fixed to two cylinders 131 provided on both sides of the core rod 110 and moved by rotating together with the rotation of the cylinders 131. Since the movement direction of the belt 130 is along the longitudinal direction of the belt 130, the movement of the belt 130 circulates along the path of the closed loop.

More specifically, the belt 130 is wound and fixed on each outer circumferential surface of the two cylinders 131, and by twisting once, the cross line 1301 is formed so that the belt 130 as a whole may have an '8' shape. The belt 130 twisted in the shape of '8' has a larger contact area with the cylinders 131 than the untwisted belt 130 to form a stronger tension, which prevents the belt 130 from spinning.

The cylinders 131 are rotated by a motor, and the rotating cylinders 131 move the belt 130. For the movement of the belt 130, the two cylinders 131 rotate in the same direction.

One side 1301a of the intersecting line 1301 of the belt 130 moves in close contact with the core rod 110 by moving while being wound around the core rod 110 at least once, which means that the belt 130 may twist the paper strip 3 more effectively. The belt 130 wound around the core rod 110 allows the entire circumference of the paper strip 3 to be pressed on the core rod 110.

The movement direction of the belt 130 may be the same direction as the direction in which the paper strip 3 is wound around the core rod 110. Since the paper strip 3 moves in one direction at the same time as being wound around the core rod 110, the paper strip 3 is consequently subjected to a twisting force in an oblique direction.

As described above, the paper strip 3 unwound from the roll 2 passes through the slit 123 of the heater 120, and it is then wound around the core rod 110.

At this time, the paper strip 3 should be fed into the heater 120, the slit 123, and the core rod 110 at an appropriate position. This is not only to prevent the paper strip 3 from interfering with the heater 120, but also to have the intended shape of the paper straw 1 wound around the core rod 110 in an appropriate pattern.

When the paper strip 3 unwound from the roll 2 is directly fed into the core rod 110 without a separate structure, the input height or left and right positions of the paper strip 3 are not constant depending on the degree of unwinding of the roll 2. In addition, the sagging of the paper strip 3 occurs in the process.

The input position adjustment part 180 serves to specify the position of the paper strip 3 fed onto the core rod 110. In addition, the input position adjustment part 180 increases the tension of the paper strip 3 so that the paper strip 3 can be tightly wound around the core rod 110. In order to increase the tension, the input position adjustment part 180 is provided with two guide members 181 so that the paper strip 3 can be inserted between the two guide members 181.

The input position adjustment part 180 is variably provided to be movable in the thickness direction (up and down direction based on FIG. 3) and the width direction (left and right direction based on FIG. 3) of the paper strip 3, so that the input point of the paper strip 3 can be adjusted as needed.

When it is assumed that the paper strip 3 is fed horizontally, the left and right direction adjustment of the input position adjustment part 180 will affect the angle of the paper strip 3 wound around the core rod 110, and furthermore the spacing between the winding paper strips 3. For example, through the left and right direction adjustment of the input position adjustment part 180, one side of the inner paper strip 3a in the width direction is wound spaced apart so that a certain gap S is created with the other side of the inner paper strip 3a of the next round, or it can be wound almost adjacently. When the width of the middle paper strip 3b is greater than the width of the inner paper strip 3a, and the width of the outer paper strip 3c is greater than the width of the middle paper strip 3b, the middle paper strip 3b may be wound partially overlapping each other L1, and the outer paper strip 3c may also be wound partially overlapping each other L2 (see FIG. 1). The inner paper strip 3a is wound so as not to overlap each other, thereby preventing the thickness of the paper straw 1 from thickening or preventing constant adhesion from interrupting, also, and the overlap of the middle paper strip 3b and the outer paper strip 3c prevents gaps from forming in the paper straw 1.

A thermal adhesive coating material 11 is provided in each overlapping region of the outer paper part 5, that is, the overlapping region of the middle paper strip 3b and the outer paper strip 3c, so that the overlapping region is also adhered to form a fixing force.

In some cases, the inner paper strip 3a, the middle paper strip 3b, and the outer paper strip 3c may all be generated so as not to overlap each other. In this case, it is possible to prevent the protrusion region (e.g., L1 or L2) from generating in the paper straw 1.

In summary, the paper strip 3 of the outer paper part 5 has a wider width than the paper strip 3 of the inner paper part 4. In a preferred example embodiment, the width of the inner paper strip 3a may be 13.5 mm, the width of the middle paper strip 3b may be 14 mm, and the width of the outer paper strip 3c may be 15 mm.

However, this may vary according to the specifications of the paper straw 1, that is, the diameter and length of the paper straw 1 as well as the material and the like. The width of the paper strip 3 can be applied in various ways from 10 mm to 30 mm.

Figure 8:
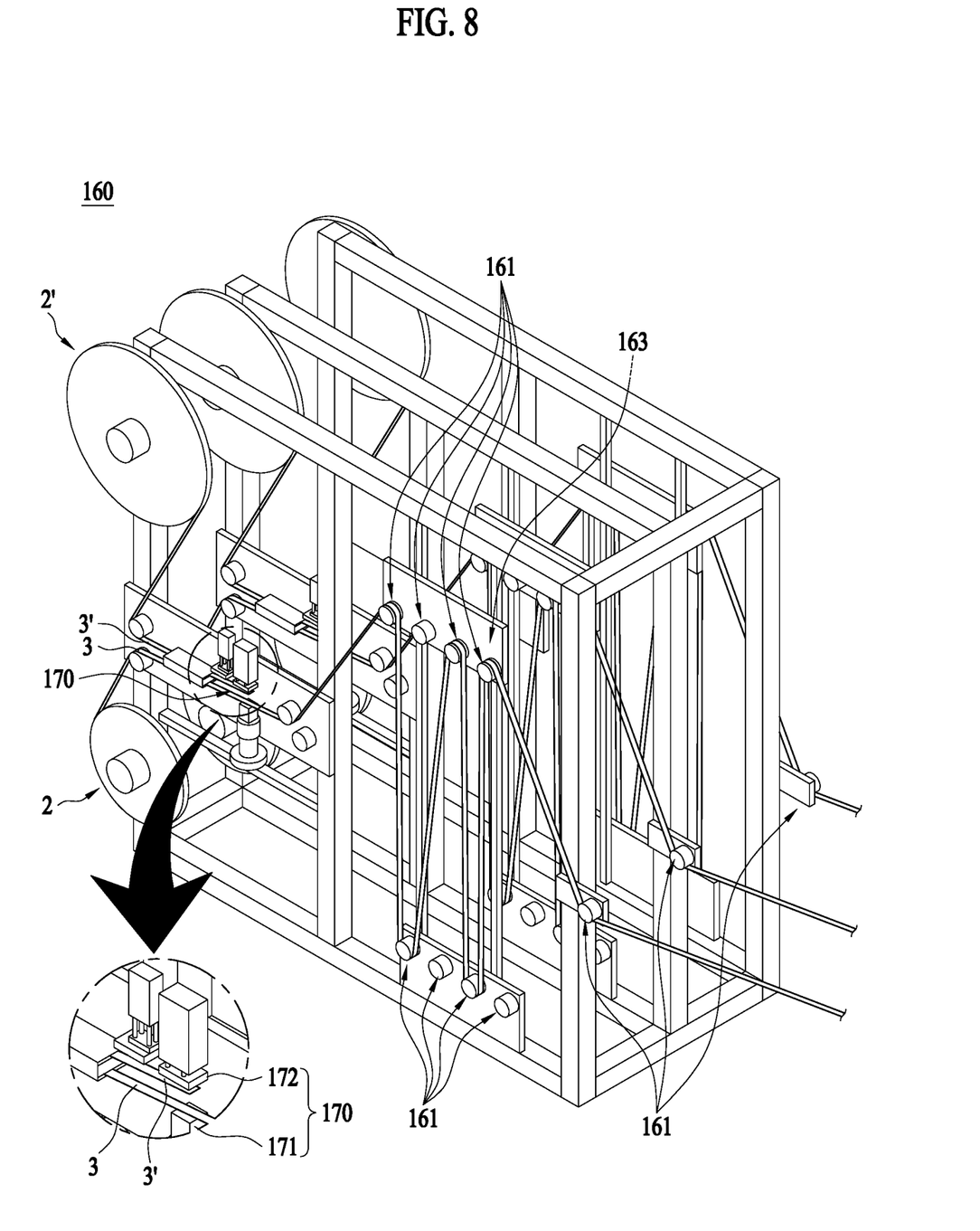
FIG. 8 illustrates a region provided with a roll holder in a paper straw manufacturing system related to the present disclosure.

FIG. 8 illustrates a region provided with a roll holder 160 in the paper straw manufacturing system 100 related to the present disclosure.

The roll holder 160 holds the paper strip 3 provided in the roll 2 before being fed onto the core rod 110. When the paper straw 1 is formed by the three-ply paper strip 3, the roll holder 160 holds the inner paper roll 2*a*, the middle paper roll 2*b* and the outer paper roll 2*c* and supplies the paper strips 3 from respective rolls.

The roll holder 160 may further include a guide roller 161. The guide roller 161 is provided between the input position adjustment part 180 and the roll 2 based on the movement path of the paper strip 3. The paper strip 3 is unwound from the roll 2 and passes through the guide roller 161 to the input position adjustment part 180. The guide roller 161 serves to not only guide the approximate direction so that the paper strip 3 can be fed at an appropriate position toward the input position adjustment part 180, but also to unwind the paper strip 3 in advance, which prevents the roll 2 from being suddenly exhausted.

In order to secure the expansion path, the guide rollers 161 may be provided on one side and the other side, respectively. In particular, by having a plurality of guide rollers 161 on one side and a plurality of guide rollers 161 on the other side, the paper strip 3 unwound in preparation may reciprocate one side and the other side in a zigzag manner.

As described above, the guide roller 161 allows the paper strip 3 to be sufficiently unwound before being fed onto the core rod 110. Accordingly, even if the paper strip 3 of the roll 2 is exhausted, a spare time is provided for the next roll 2, that is, the preparatory roll 2' to be fed. In particular, when the roll 2 in use is about to be exhausted, the end point of the roll 2 in use, that is, the inner end of the paper strip 3, is connected to the starting point of the preparatory roll 2', that is, the outer end of the paper strip 3. In this case, the paper strip 3 may be continuously fed onto the core rod 110 without additional measures or time delay. The guide roller 161 secures time to connect the two paper strips 3.

In particular, by using the properties of the thermal adhesive coating material 11 provided in the paper strip 3, the end point of the previous roll 2 and the start point of the preparatory roll 2' can be connected by heating and pressing. Accordingly, a part where the paper strip 3 is cut off or a dead area connected otherwise does not generated, so that continuous production is possible and resource is not wasted.

The two paper strips 3 of the roll 2 and the preparatory roll 2' may be connected by a connecting part 170. The connecting part 170 may include a heating part 171 that generates heat to heat the thermal adhesive coating material 11 of the two paper strips 3 and a pressing part 172 that presses and compresses the heated paper strip 3. The heating part 171 and the pressing part 172 may be integrally formed to constitute the connecting part 170.

The pressing part 172 has two pressing members provided on both sides so that the paper strip 3 and the preparatory paper strip 3' pass therebetween, and the two pressing members get close selectively to compress the paper strip 3. Among them, one pressing member may be the above-described heating part 171. The heated and pressed paper strips 3 are connected to each other by the thermal adhesive coating material 11.

In addition, a distance between at least two guide rollers 161 corresponding to one side and the other side among the plurality of guide rollers 161 may be selectively narrowed. This is because even when connecting both ends of the two paper strips 3 by heating and pressing using the connecting part 170, the paper strips 3 are continuously fed, which makes sure that the connected portion of the two paper strips 3 does not be pulled into the input point.

Narrowing of one side of the guide roller 161 and the other side of the guide roller 161 may be implemented by an elastic part 163 having a restoring force such as a spring structure. That is, even if the gap is momentarily narrowed due to the pulling of the paper strip 3, the restoring force of the elastic part 163 provided on at least one side restores the gap between the two guide rollers 161 to the original position, and returns to a normal state.

Figure 9:
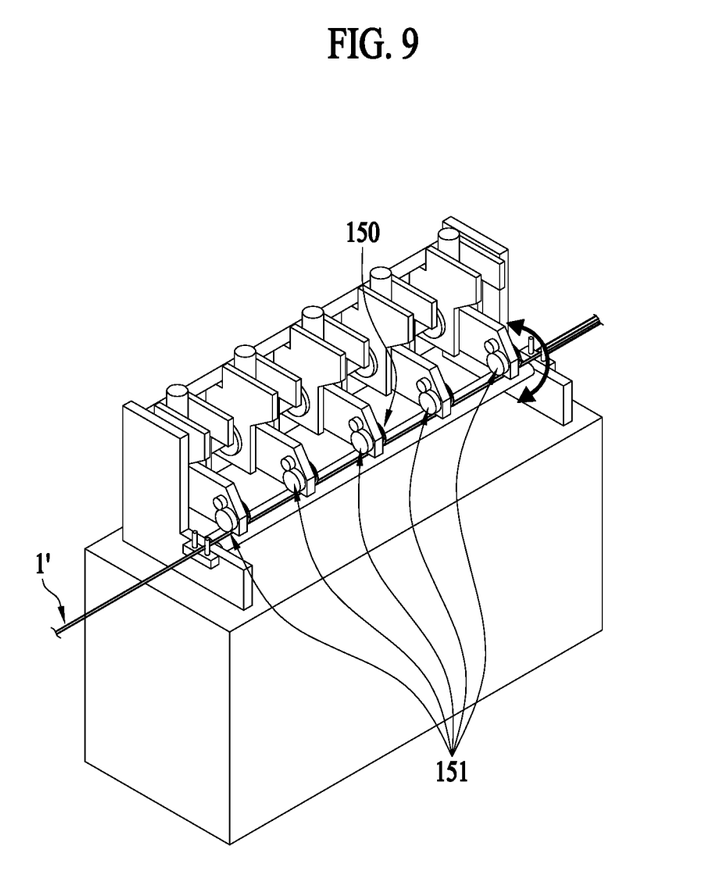
FIG. 9 illustrates a region provided with a cutting part in a paper straw manufacturing system related to the present disclosure.

FIG. 9 illustrates a region provided with a cutting part 150 in the paper straw manufacturing system 100 related to the present disclosure.

The preparatory straw 1' formed by being wound around the core rod 110 is continuously advanced in one direction by the movement guide part 140. This advancing direction is the opposite side to the side where the paper strip 3 to be fed is located in the longitudinal direction of the core rod 110.

The advanced preparatory straw 1' is cut to a predetermined length by the cutting part 150 to make the preparatory straw 1' to be a straw. The cutting part 150 may include a plurality of blades 151 spaced apart at regular intervals. The blades 151 may be implemented in the form of a rotating circular blade 151, and a plurality of straws are repeatedly produced from the supplied preparatory straw 1' by performing a reciprocating motion. As the number of blades 151 increases, the number of paper straws 1 that can be produced at one time may increase. Therefore, this means that it is possible to slow down the moving speed of the preparatory straw 1' relatively, which in turn can reduce the load on the driving apparatus required for the movement of the preparatory straw 1'.

The formed straws can be moved and loaded via a conveyor. Since the paper straw 1 of the present disclosure does not require a drying process, it can be directly loaded by a conveyor, and can be packaged immediately, thereby improving production efficiency.

Mode for Carrying Out the Invention

It is apparent to those skilled in the art that the present disclosure may be embodied in other specific forms without departing from the spirit and essential characteristics of the present disclosure.

The above detailed description should not be construed as restrictive in all respects and should be considered as illustrative. The scope of the present disclosure should be determined by a reasonable interpretation of the appended claims, and all modifications within the equivalent scope of the present disclosure are included in the scope of the present disclosure.

INDUSTRIAL APPLICABILITY

The above-mentioned features may be partially or wholly applied to the field of paper straws.

The invention claimed is:

1. A paper straw comprising:
an inner paper part comprising a single paper strip that does not have a thermal adhesive coating material on an inner surface and is spirally wound to form one layer; and
an outer paper part comprising at least one paper strip forming at least one layer by wrapping an outer peripheral surface of the inner paper part while spirally wound, an outer surface of the paper strip forming an outermost layer being provided with a thermal adhesive coating material,
wherein the paper strip of the outer paper part has a wider width than the paper strip of the inner paper part,
a thermal adhesive coating material is provided between two paper strips of adjacent different layers, and
the thermal adhesive coating materials have adhesion or water resistance by heating and curing.

2. The paper straw of claim 1, wherein the thermal adhesive coating material provided on the outer surface of the paper strip forming the outermost layer and the thermal adhesive coating material provided between the two paper strips of the adjacent different layers are composed of a same ingredient.

3. The paper straw of claim 1, wherein the thermal adhesive coating materials comprise an acrylate-based heat-sealable material.

4. The paper straw of claim 1, wherein the thermal adhesive coating material provided on the outer surface of the paper strip forming the outermost layer has water resistance by heating and curing, and the thermal adhesive coating material provided between the two paper strips of the adjacent different layers has adhesion and water resistance by heating and curing.

5. The paper straw of claim 1, wherein a width of each of the paper strips is 10 mm to 30 mm.

6. The paper straw of claim 1, wherein the paper strip corresponding to the inner paper part does not overlap while spirally wound, and each paper strip corresponding to the outer paper part overlaps while spirally wound.

7. The paper straw of claim 6, wherein a thermal adhesive coating material is provided in the overlapping region of the outer paper part.

8. The paper straw of claim 1, wherein each of the paper strips is provided by a mass per unit area of 40 gsm to 120 gsm.

9. The paper straw of claim 8, wherein a ratio of mass per unit area of the paper strip forming the outermost layer of the outer paper part with respect to the paper strip of the inner paper part is 0.5 to 0.8.

10. The paper straw of claim 1, wherein a mass per unit area of the thermal adhesive coating material provided on one surface of any one of the paper strips is 1 gsm to 15 gsm.

11. The paper straw of claim 10, wherein the thermal adhesive coating material is provided with an amount of 1 gsm to 3 gsm on the outer surface of the paper strip forming the outermost layer, and
the thermal adhesive coating material is provided with an amount of 10 gsm to 20 gsm between the two paper strips of the adjacent different layers.

12. The paper straw of claim 11, wherein the paper strips are kraft papers, and the thermal adhesive coating material is provided with an amount of 14 gsm to 20 gsm between the two paper strips of the adjacent different layers.

13. The paper straw of claim 10, wherein a ratio of mass per unit area of the thermal adhesive coating material provided on the outer surface of the paper strip forming the outermost layer with respect to the thermal adhesive coating material provided between the two paper strips of the adjacent different layers is 0.1 to 0.6.

14. The paper straw of claim 1, wherein the inner paper part forms an inner paper layer, and
two paper strips of the outer paper part are spirally wound to form a middle paper layer and an outer paper layer, respectively.

15. The paper straw of claim 14, wherein both surfaces of the middle paper layer and both surfaces of the outer paper layer are provided with thermal adhesive coating materials.

16. The paper straw of claim 14, wherein a width of the paper strip of the outer paper layer is larger than a width of the paper strip of the middle paper layer.

17. The paper straw of claim 16, wherein a width of the paper strip of the inner paper layer is 13.5 mm,
the width of the paper strip of the middle paper layer is 14 mm, and
the width of the paper strip of the outer paper layer is 15 mm.

* * * * *